United States Patent

[11] 3,583,621

| [72] | Inventor | Howard Francis Bryant<br>Akron, Ohio |
|---|---|---|
| [21] | Appl. No. | 793,383 |
| [22] | Filed | Jan. 23, 1969 |
| [45] | Patented | June 8, 1971 |
| [73] | Assignee | The General Tire & Rubber Company |

[54] TURNING DEVICE FOR USE IN CONVEYOR SYSTEMS FOR SHEET MATERIAL
15 Claims, 3 Drawing Figs.

[52] U.S. Cl. .................................................. 226/189, 226/197
[51] Int. Cl. .................................................. B65h 17/22
[50] Field of Search .................................... 226/197, 108; 193/35, 36, 37; 226/189

[56] References Cited
UNITED STATES PATENTS
2,212,006  8/1940  Buchanan..................... 198/187(X)
1,827,079  10/1931  Fahrenwald.................. 226/189(X)

*Primary Examiner*—Allen N. Knowles
*Assistant Examiner*—Gene A. Church
*Attorneys*—Harry F. Pepper, Jr. and Frank C. Rote, Jr.

ABSTRACT: Disclosed is a device used to diver conveyed sheet material through a turn of a substantial angle. The device includes a substantially frictionless surface composed of a plurality of relatively small skate wheels arranged in spaced guide paths. The paths are substantially linear from adjacent the front end of the device toward the rear and extend spirally over the rear edge thereof. The device may be positioned with its front end adjacent the discharge end of a first conveyor whereby the sheet material is guided by the linearly arranged wheels to the rear edge of the device where it is turned over onto a second conveyor moving in an angular direction with respect to the first conveyor.

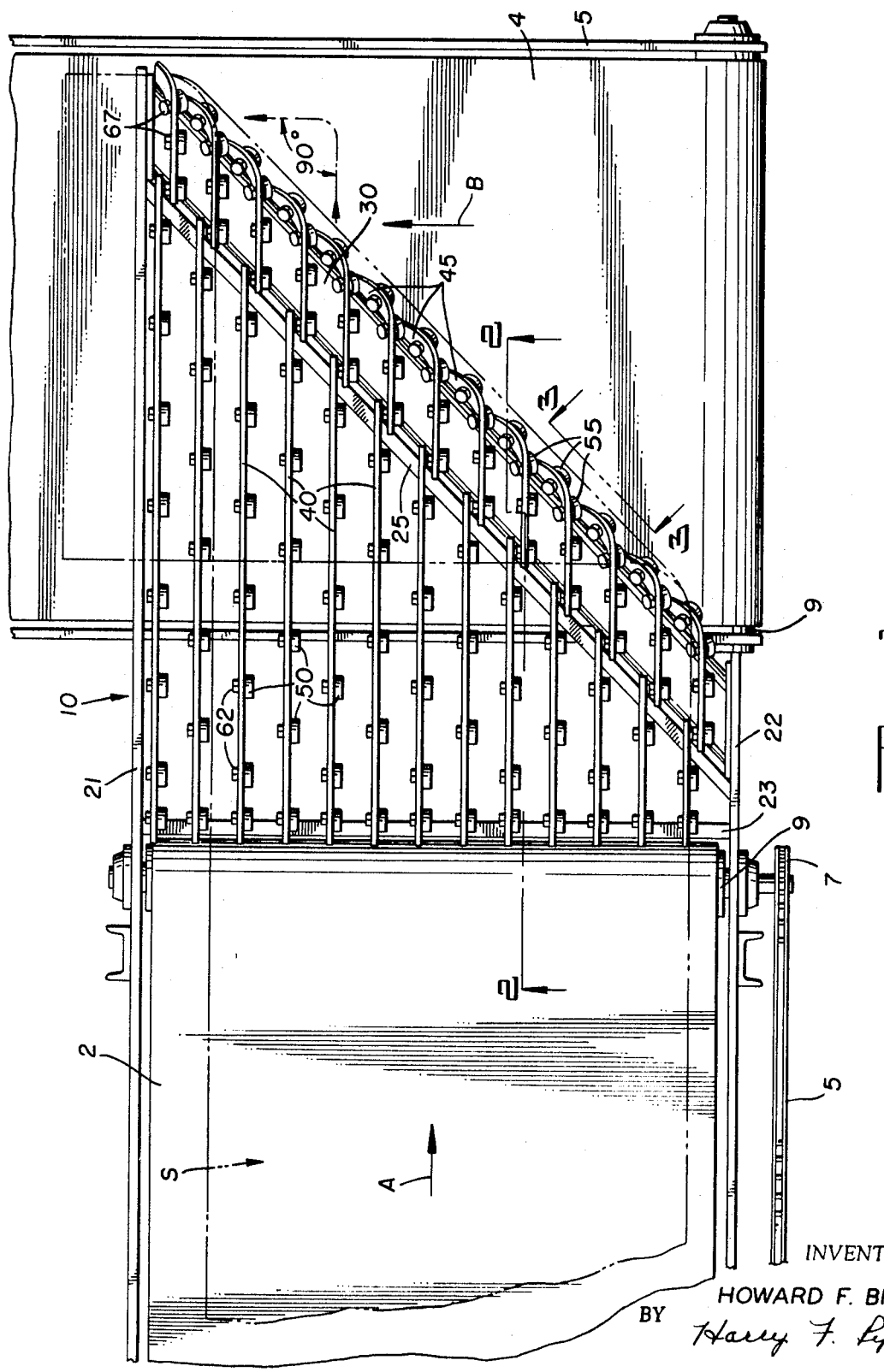

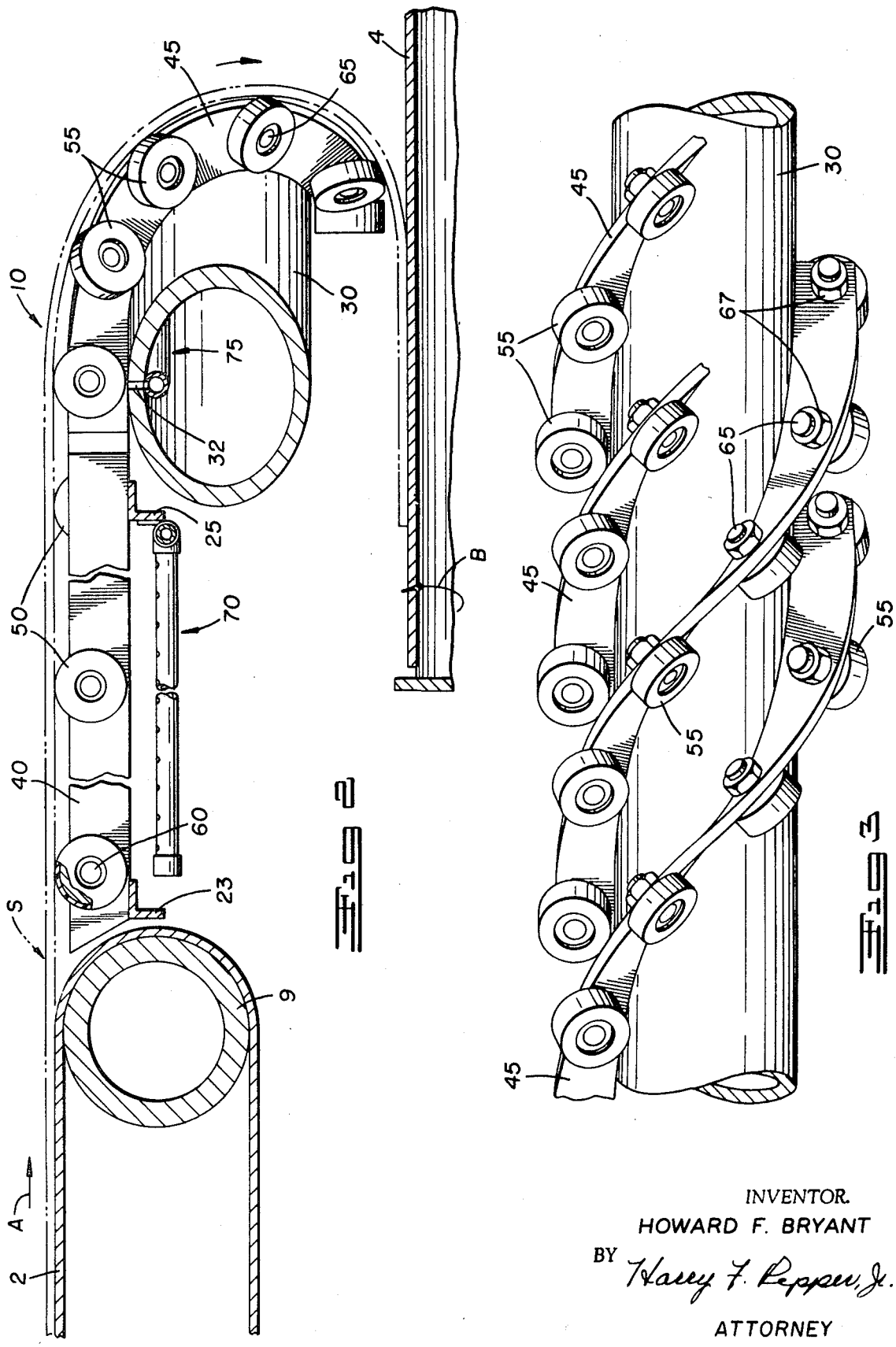

TURNING DEVICE FOR USE IN CONVEYOR SYSTEMS FOR SHEET MATERIAL

BACKGROUND OF THE INVENTION

The invention relates to a turning device for use in a conveyor line and more particularly to a device adapted to turn conveyed sheet material through a substantial angle.

In many material handling systems where material is to be conveyed to and from a plurality of processing stations, it is often necessary to divert, or alter the direction of the material as it moves through the system. The degree of directional change may be slight or it might be necessary to turn the material through a substantial angle. The material may be diverted by removing it from a main conveyor and placing it on a short branch conveyor. Sometimes the main conveyor line itself may be designed with angular turns because of peculiar space requirements.

In conveyor systems where the material is being moved by means of belt conveyors, a substantial angular turn is often effected by using two conveyors, one disposed at a substantial angle with respect to the other. Thus, the material completes the turn by being transferred from one conveyor to the other. The more modern conveyor systems are provided with a device to facilitate this transfer. The particular design of these devices depends on many factors peculiar to the systems in which they are to be used.

An important factor affecting the design of a turning device is the physical nature of the material being conveyed. If the material is in the form of distinct articles, such as boxes, crates, or the like, it is common that the turning zone be substantially planar, e.g. the two conveyors and the turning device lie substantially in the same plane. However, if the conveyed material is in the form of a continuous sheet or web, a planar turning zone is undesirable, since guiding sheet material through a planar turn will likely break or tear the sheet. Turning devices which are particularly suited for material in article form are disclosed in U.S. PAT. Nos. 872,856; 2,759,585 and 3,334,723.

To turn sheet or web material effectively through a substantial angle, it is common that one of the two angularly disposed conveyors be situated above the other. It is usually preferred that the conveyor which feeds the sheet to the turn be above the conveyor taking it from the turn. A turning device located between the conveyors functions to continuously guide sheet material from the first conveyor and transfer it to the second conveyor. However, a turning device of this type also functions to invert the sheet prior to its contacting the second conveyor. Therefore, a typical turning device for sheet or web material turns the sheet over while simultaneously redirecting the sheet onto the second conveyor.

Such a turning device, in order to function as described, is usually provided with a diagonally disposed turning edge over which the sheet passes. This turning edge is usually situated so that it is substantially coplanar with the first conveyor and above the second conveyor. Thus, material continuously passing from the first conveyor, over the edge and onto the second conveyor will be turned over due to the particular disposition of the edge in relation to the two conveyors. This type of device may consist simply of a diagonal bar or roll angularly disposed with respect to, and spaced from, the discharge end of the first conveyor such as disclosed in U.S. PAT. Nos. 1,273,926 and 3,368,729. This type of mechanism is satisfactory only if the material being turned is non amorphous, i.e., it is substantially nonplastic, such as metal, film, paper and the like. On the other hand, if the material is somewhat amorphous, then the turning mechanism must also include a forward portion to guide and support material from immediately adjacent the end of the first conveyor up to and over the turning edge thereof. This latter type of turning fixture is generally disclosed in U.S. Pat. No. 3,048,314.

Thus, a device or mechanism used in diverting sheet material of an amorphous nature should include a forward supporting and guiding portion and a diagonally disposed turn over edge portion. The forward support and guiding portion of this type of mechanism usually is designed with a series of cylindrical rolls of graduated length such as shown in the aforementioned U.S. Pat. No. 3,048,314. While this type of mechanism has been satisfactory for some types of sheet material, other types, such as uncured continuous sheets of rubber, do not satisfactorily pass over such surfaces. It has also been found that in situations where it is necessary to stop or reverse the direction of the conveyor line that material such as rubber sheet seeps or sags between these rolls which may cause deterioration of the sheet. Therefore a need exists for a transfer device which will evenly support and uniformly guide sheet material of this type through a turn without any of the aforementioned disadvantages.

BRIEF DESCRIPTION OF THE INVENTION

It is an object of the present invention to provide a turning device to effectively transfer continuous or elongated sheet material from one conveyor to another angularly disposed with respect thereto, without regard to the nature of the material transferred.

It is another object to provide a turning mechanism for use in a conveyor system which effectively guides sheet material from one conveyor, inverts and repositions it onto a second conveyor angularly disposed with respect to the first conveyor. It is another object of the invention to provide a device for supporting and guiding sheet material through a turn effected by two angularly disposed conveyors moving in predetermined directions, which is equally effective in case it is necessary to momentarily stop or reverse the movement of the conveyors.

It is still another object of the present invention to provide a turning device for continuously transferring sheet material from one conveyor over onto a second conveyor angularly disposed with respect to the first conveyor which has in effect a transfer surface substantially void of any support gaps which may tend to resist movement of the sheet.

The transfer or turning device according to the present invention comprises a transfer surface defined by a plurality of freely rotatable, small skate wheels with smooth peripheral surfaces. The skate wheels are specially arranged in a plurality of spaced, substantially parallel guide paths which extend from the front end of the device up to and over the rear edge. The portions of each guide path from adjacent the front end to the rear edge are substantially linear while the portions of each path extending over the edge are substantially spiral. The linear and spiral portions of each path are affected by a linear and spiral arrangement respectively, of the skate wheels which define each path. All the linearly arranged skate wheels are mounted on axes which are both mutually parallel and coplanar.

DESCRIPTION OF THE DRAWINGS

These and other objects of the invention will be fully apparent from the following detailed description relating to a preferred embodiment exemplified in the drawings wherein:

FIG. 1 is a plan view of a turning device according to the present invention shown disposed in operative relation with two angularly disposed conveyors.

FIG. 2 is a partial cross-sectional view taken along lines 2–2 of FIG. 1 depicting the arrangement of skate wheels in one of the guide paths of the device, with parts broken away and shown in section.

FIG. 3 is a partial end view of the turn over edges of the turning device taken along lines 3–3 of FIG. 1 with parts omitted and shown in section.

DETAILED DESCRIPTION OF A PREFERRED EMBODIMENT

Referring now in particular to FIGS. 1 through 3, wherein like numerals designate like parts throughout the several views, a first conveyor 2 and a second conveyor 4 are shown disposed so as to convey at an angle of 90° with respect to each other. The conveyor 2 is illustrated as moving in the direction of arrow A, while conveyor 4 is to move in the direction of arrow B. As seen more clearly in FIG. 2, conveyor 4 is situated slightly below conveyor 2. The conveyors 2 and 4 are each moved in the usual manner by suitable drive rolls 9, operatively associated with a typical drive belt 5 and pulley 7, which are connected to a suitable power source (not shown). The means for moving the conveyors 2 and 4 may be of any desired construction, and the particular means shown in the drawings is for purposes of illustration only.

A transfer or turning device 10, which is the subject of the present invention, is shown mounted between the two conveyors 2 and 4. The device 10 includes a main frame which incorporates parallel side members 21 and 22, crossbeams 23 and 25, and a cylindrical tube 30.

The side members 21 and 22 are shown as integral extensions of the side supports for conveyor 2, however, these side members may be structurally independent of conveyor 2 and supported directly by the floor or base (not shown). As seen in FIG. 1, both side members 21 and 22 are disposed above conveyor 4, with member 21 extending substantially completely thereacross. The lengths of side members 21 and 22 are thus dependent upon both the distance between conveyors 2 and 4 and the width of conveyor 4. Specifically, the length of side member 22 depends upon the distance between conveyors while the member 21 depends upon the distance between conveyors plus the width of the second conveyor 4. In other words, the length of side member 21 should be greater than side member 22 by an amount substantially equal to the distance across conveyor 4.

Sides 21 and 22 of the main frame are joined by crossbeams 23 and 25. Crossbeam 23 is located near the front of the device 10 while crossbeam 25, spaced from beam 23, connects the side members 21 and 22 along a line parallel to the line including the ends of sides 21 and 22. The crossbeams 23 and 25 may be L-shaped as shown, or of any other suitable design While there are two crossbeams shown in FIGS. 1 and 2, it is understood that any number may be used. The actual number necessary will likely depend upon the amount of support required and the length of side members 21 and 22.

Also forming a part of the main frame of the device 10 is a cylindrical tube 30 connecting side members 21 and 22 adjacent the ends thereof. The axis of tube 30 is substantially parallel to the cross-beam 25. A simple wrought iron pipe has been found to function satisfactorily as tube 30. Cylindrical tube 30 not only functions as part of the main frame, but serves other purposes as will be later described.

Thus, the main frame is structurally defined by side members 21 and 22, crossbeams 23 and 25 and tubular member 30 and is substantially in the shape of a right-trapezoid, with one end parallel with the end of conveyor 2 while the opposite end extends above and diagonally across the lower conveyor 4.

The particular design of the main frame as described above may, of course, be changed without departing from the scope of the invention. The frame may be simplified or made more complex depending upon the particular requirements of the situation in which the device 10 is used. The frame as herein described has been found particularly suited for device functioning to turn material through a 90° angle. When it is desired to turn material through angles less or more than 90°, the frame as disclosed herein should be modified in accordance with the particular angular turn. For example, the diagonal disposition of tubular member 30 should be altered in accordance with angular turns other than 90°. Altering the disposition of tube 30 would, of course, necessitate changing the lengths of side members 21 and 22.

Returning again to FIGS. 1 through 3, the framework for the operating surface of transfer device 10 is provided by a series of laterally spaced pairs of support ribs. Each pair of ribs includes a linear rib 40 and a spiral rib 45. The ribs may be made of any desired material, called rolled steel having been found highly satisfactory.

Each linear rib 40 extends from the front end of the device and terminates adjacent the cylindrical tube 30. Ribs 40 commence at the forward end of the device from points which collectively lie along a horizontal line. Thus, the commencement points of linear ribs 40, in effect, impart a linear front end to the transfer device 10. Preferably, this linear end is disposed practically contiguous to, and parallel with, the end of conveyor 2. As stated, the ribs 40 terminate adjacent the cylindrical tube 30, and preferably terminate at points which collectively define a line parallel to the axis of tube 30. As a result, as seen in FIG. 1, ribs 40 progressively increase in length from side member 22 to side member 21. The ribs 40 are attached to crossbeams 23 and 25 in any suitable manner, as for instance, by welding The spiral ribs 45 are attached to the outer surface of tube 30. The ribs 45 are of equal length and substantially identical curvature. The ribs 45 curve downwardly around to the underside of tube 30 and simultaneously extend in the direction of travel of conveyor 4. In the preferred form, the ribs 45 are disposed around tube 30 in substantially helical paths with pitch directions generally in the direction of arrow B. However, the ribs 45 may take any alternative curvelinear path found more suitable in a particular situation.

Each linear rib 40 supports a predetermined number of selectively spaced, small wheels 50, commonly called and hereinafter referred to as "skate" wheels. Skate wheels 50 are mounted along one side of each rib 40 on short spindles 60 extending through the rib and secured on the opposite side thereof by nuts 62. Spindles 60 may be of any suitable material, but in case water sprays as hereinafter disclosed are used, the spindles should be made of a rust-resistant material such as stainless steel. Spindles 60 are positioned such that skate wheels 50 can freely rotate about mutually parallel axes which are coplanar. The skate wheels 50 are of substantially equal radii and the radii are such that the wheels extend a predetermined distance above the upper edge of each rib 40. Except for the first wheel on each rib 40, it is preferred that the spacing of wheels 50 along each rib is such that wheels 50 on a given rib are longitudinally offset with respect to wheels mounted on an immediately adjacent rib. This feature will effectively prevent large support gaps across the width of the device.

Each linear arrangement of skate wheels 50 on each rib 40 is operatively associated with a spiral arrangement of skate wheels 55 mounted on a spiral rib 45. The spiral ribs 45 each support an equal number of skate wheels 55. Skate wheels 55 may be larger, smaller or the same size as skate wheels 50. In the embodiment shown, skate wheels 50 are substantially identical to skate wheels 50. Whatever their size in relation to wheels 50, a portion of the periphery of each wheel 55 should extend beyond the outer edge of the rib on which it is mounted.

A selected plurality of wheels 55 are supported along one side of each rib 45, and are each freely rotatable n a short spindle 65 extending through rib 45 and secured by a nut 67. The spindles 65 are materially similar to spindles 60. The spindle axes on each rib 45 are disposed such that the peripheral portions of the wheels 55 extending beyond the rib outer edge will collectively define a curvelinear path substantially identical to the curvature of the rib.

Thus, the ribs 45 and attached wheels 55 form the diagonally disposed turnover edge of the device 10. As seen in FIGS. 2 and 3 it is preferred that the first wheel on each rib 45, i.e. the wheel on the upper side of the device, be mounted on an axis substantially perpendicular to the direction indicated by arrow A, while the terminal skate wheel on each rib, i.e. on the underside of the device, should be mounted along an axis substantially perpendicular to the direction indicated by arrow B.

From the foregoing, it is seen that the transfer surface of the device 10 is composed of a plurality of mutually parallel guide paths, each path defined by a linear arranged plurality of skate wheels 50 and a spirally arranged plurality of skate wheels 55.

While the wheels defining each path are shown supported on a pair of ribs, alternate means for supporting the wheels may be provided without departing from the scope of the invention. For example, the linearly arranged wheels may rotate on axles mounted directly in side members 21 and 22. Also, while providing pairs of ribs 40 and 45 has been found more practical from a fabrication standpoint, a single rib with a forward linear portion and a rearward curved portion could be used in lieu of each pair of ribs. In other words, the particular means used to support the wheels is not deemed critical to the instant invention. It is important only that the wheels be supported so as to define the particular paths as heretofore described.

It is preferred that the wheels 50 and 55 be made of a substance requiring little or no lubrication such as, for example, nylon. A commercially available substance containing nylon interspersed with molybdenum disulfide has been found highly acceptable as a skate wheel material. Because of the relatively large number of wheels used and the high rotational demands on each wheel, wheels of a material requiring lubrication would be impractical.

Referring to FIG. 2, liquid spray means 70 are shown located beneath the forward portion of the device 10. This means may be of any suitable design and is for the purpose of lubricating the outer surfaces of wheels 50 in the event device 10 is used to turn a tacky sheet such as uncured rubber. Moistening the underside of the sheet as well as the wheels will prevent the sheet from sticking to the wheels 50. A spray means 75 is shown within tube 30 and cooperates with openings 32 in the tube to provide liquid for moistening wheels 55. A suitable liquid may be used for this purpose, as for example water. When the nylon type wheels are employed, water also serves as a lubricant for the wheels themselves. Liquid is provided from a suitable source (not shown). The sprays are necessary only when the material is such that it may possibly stick to the wheels defining the guide paths of the device.

The operation of the device will now be described as it functions to turn a continuous sheet of rubber. Rubber sheet S moving initially in the direction of arrow A is shown by the dot-dash outline in FIGS. 1 and 2. The sheet S moves smoothly along the forward portion of the surface of the device 10 defined by the wheels 50. Initially, force from the conveyor 2 will push the sheet across the device and the front edge will drop over the turnover edge defined by wheels 55. The conveyor 4 will contact the opposite surface of sheet S thereby inverting it and carry the sheet in the direction of arrow A. The sheet will then continuously move from conveyor 2, across the device 10 and be inerted onto conveyor 4, thereby continuously completing the desired angular turn. Because of the guide paths formed by wheels 50 and 55, the sheet S experiences no support gap throughout its travel across device 10. Water is continuously sprayed on the sheet and wheels by sprays 70 and 75 to prevent the sheet from temporarily sticking to the wheels.

The foregoing description relates only to a preferred embodiment of the invention and it is understood various modifications and alterations may be made without departing from the contemplated scope of the invention, which is to be measured by the appended claims.

What I claim is:

1. A turning device for sheet material comprising a frame, transfer means supported by said frame, said transfer means including a substantially frictionless guide surface having a linearly disposed forward end adapted to be positioned at the discharge end of a first conveyor and a rearward turnover edge adapted to overlie a second conveyor angularly disposed with respect to said first conveyor, said frictionless guide guide surface comprising a multiplicity of freely rotatable skate wheels disposed in laterally spaced, substantially mutually parallel, guide paths, each of said paths characterized by A. a substantially linear arrangement of said skate wheels extending from adjacent said forward end to a point adjacent said rearward turnover edge wherein each of a selected number of said skate wheels is longitudinally offset relative to the skate wheels in an adjacent guide path such that no substantial support gaps are present transversely of said device, and B. a substantially spiral arrangement of said skate wheels extending over said edge.

2. The device as defined in claim 1 wherein the axes of said linearly arranged skate wheels are coplanar.

3. The device as defined in claim 1 wherein the axes of said linearly arranged skate wheels are substantially parallel to the forward end of said guide surface.

4. The device as defined in claim 2 wherein the axes of said linearly arranged skate wheels are substantially parallel to said forward end of said guide surface.

5. The device as claimed in claim 4 wherein each of said spiral arrangements of skate wheels includes a terminal skate wheel rotatable about an axis normal to a plane including the forward end of said surface which is perpendicular to the plane of the axis of said linearly arranged skate wheels.

6. The device as defined in claim 1 wherein each of said spiral arrangements of skate wheels contains an equal number of said skate wheels.

7. The device as defined in claim 1 wherein the lengths of said linear arrangements of skate wheels progressively increase from one side of said guide surface to the other.

8. The device as defined in claim 2, wherein each of said spiral arrangements of skate wheels contains an equal number of said skate wheels.

9. The device as defined in claim 3, wherein each of said spiral arrangements of skate wheels contains an equal number of said skate wheels.

10. The device as defined in claim 4, wherein each of said spiral arrangements of skate wheels contains an equal number of said skate wheels.

11. The device as defined in claim 5, wherein each of said spiral arrangements of skate wheels contains an equal number of said skate wheels.

12. The device as defined in claim 2, wherein the lengths of said linear arrangements of skate wheels progressively increase from one side of said guide surface to the other.

13. The device as defined in claim 3, wherein the lengths of said linear arrangements of skate wheels progressively increase from one side of said guide surface to the other.

14. The device as defined in claim 4, wherein the lengths of said linear arrangements of skate wheels progressively increase from one side of said guide surface to the other.

15. The device as defined in claim 5, wherein the lengths of said linear arrangements of skate wheels progressively increase from one side of said guide surface to the other.